Sept. 10, 1946.          E. L. GINZTON          2,407,267
ULTRA HIGH FREQUENCY ATTENUATOR
Filed March 5, 1943          2 Sheets-Sheet 1
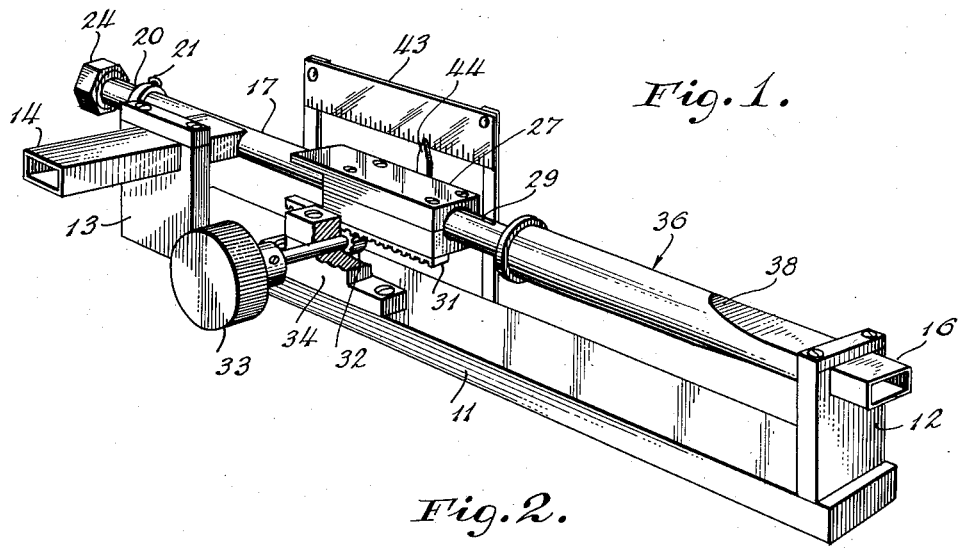
Fig. 1.
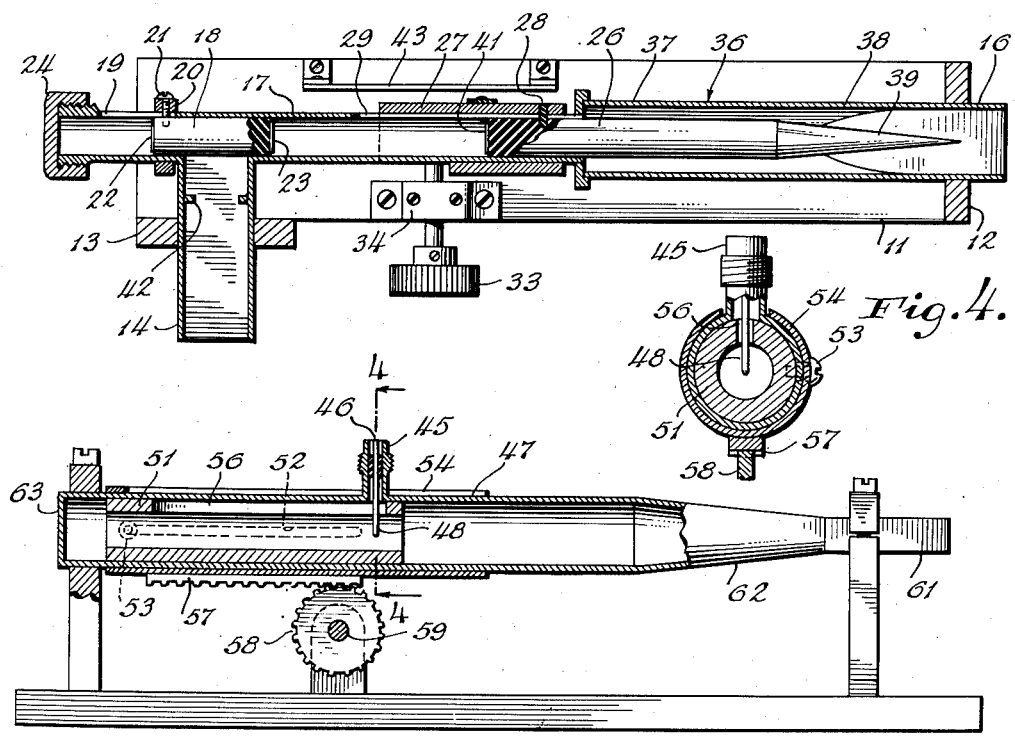
Fig. 2.
Fig. 4.
Fig. 3.
INVENTOR
EDWARD L. GINZTON
BY Paul B. Hunter
ATTORNEY

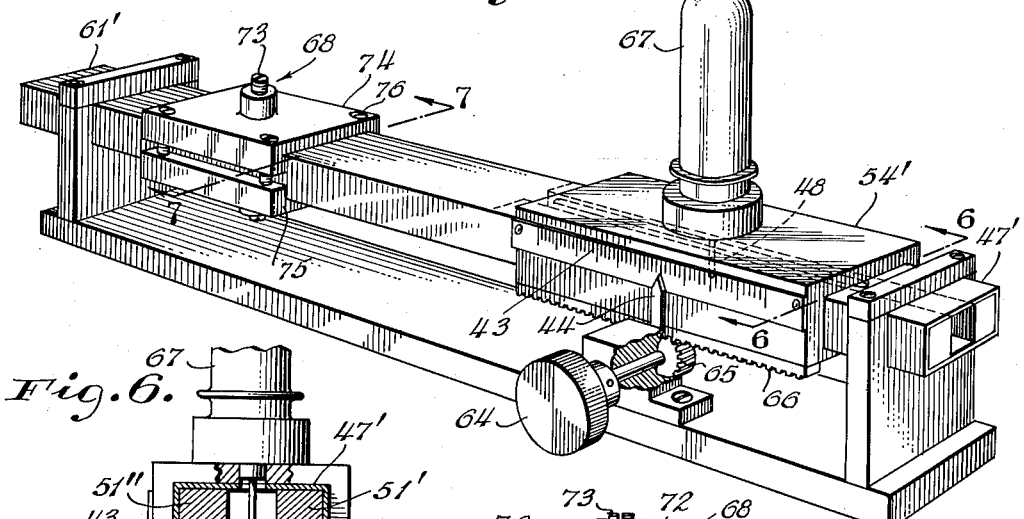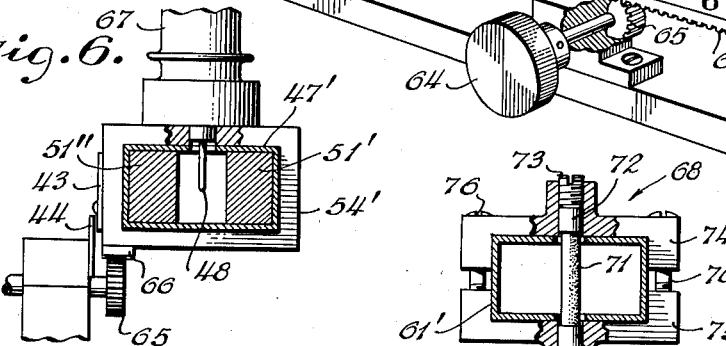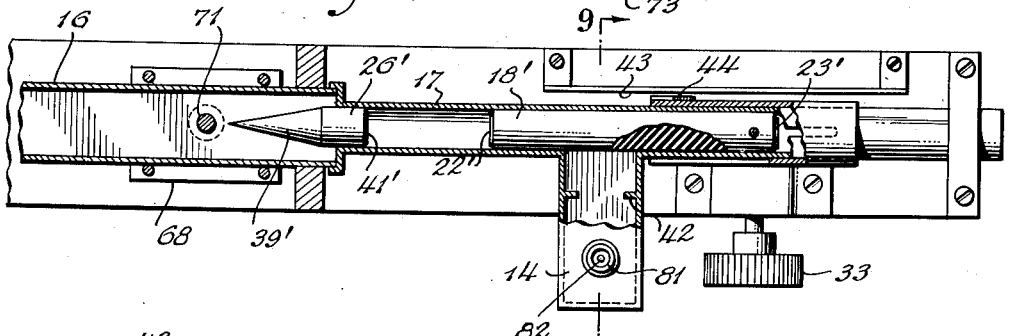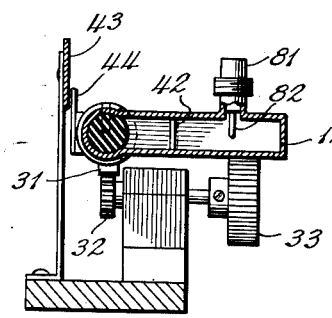

Patented Sept. 10, 1946

2,407,267

UNITED STATES PATENT OFFICE 2,407,267

ULTRA HIGH FREQUENCY ATTENUATOR

Edward L. Ginzton, Wantagh, N. Y., assignor to Sperry Gyroscope Company, Inc., Brooklyn, N. Y., a corporation of New York Application March 5, 1943, Serial No. 478,163

13 Claims. (Cl. 178—44)

The present invention relates to devices for attenuating ultra high frequency electromagnetic energy, and especially to devices adapted for use in concentric transmission line systems or in wave guide systems.

In many high frequency systems it is necessary or desirable to attenuate the energy derived from an ultra high frequency source or flowing in a high frequency circuit by a predetermined amount. In prior copending application Serial No. 452,319, filed July 25, 1942, in the name of W. W. Hansen, there are disclosed a number of types of attenuators suitable for use with concentric transmission lines or wave guides. Such attenuating devices, provided with means for preventing undesired wave reflections or standing waves, are variable over considerable range and are of fixed length whereby they may be permanently and rigidly connected in the system wherein they are used.

The present invention constitutes an improvement over the attenuators shown in the prior copending application. In this prior application, the several forms of attenuator shown utilize adjustable lengths of wave guide having cross-sectional dimensions smaller than the minimum required for free propagation of the ultra high frequency energy which may be termed the cut-off dimension. As is therein described, such cut-off wave guides serve to attenuate the energy supplied to them, the amount of attenuation being related to the length of the wave guide section. However, the attenuators of the prior application have required special apparatus for coupling either a concentric transmission line or a wave guide to the attenuator wave guide section in order to provide the desired attenuation. Furthermore, the required adjustability of the devices of the prior application was obtained only by the use of various sliding or telescoping joints which rendered these devices relatively complicated and difficult to manufacture.

By the present invention, I provide several types of adjustable attenuator utilizing the same principle of a wave guide dimensioned below cut-off, but providing ease of adjustment and construction and eliminating the necessity for special coupling or metallic telescoping joints or sliding joints.

Accordingly, it is an object of the present invention to provide improved ultra high frequency attenuating devices which are relatively simple to adjust and construct.

It is a further object of the present invention to provide improved attenuating devices which may be directly connected to concentric line or wave guide utilization devices or energy sources.

It is still another object of the present invention to provide improved attenuating devices of the adjustable wave guide type which are of fixed length and may be permanently connected in a system.

Other objects and advantages will become apparent from the specification taken in connection with the accompanying drawings, wherein the invention is embodied in concrete form.

In the drawings,

Fig. 1 shows a perspective view of one form of attenuator according to the present invention.

Fig. 2 shows a longitudinal horizontal cross-section of the device of Fig. 1.

Fig. 3 shows a longitudinal vertical cross-section of a modification of the attenuator of Fig. 1.

Fig. 4 shows a cross-section of the device of Fig. 3 taken along line 4—4 thereof.

Fig. 5 shows a perspective view of another modification of the present invention.

Fig. 6 shows a transverse cross-section of the device of Fig. 5 taken along line 6—6.

Fig. 7 shows another transverse cross-section of the device of Fig. 5 taken along line 7—7.

Fig. 8 shows a longitudinal horizontal cross-section of still another form of the present invention.

Fig. 9 shows a transverse cross-section of the device of Fig. 8 taken along line 9—9 thereof.

Referring to Figs. 1 and 2, the wave guide attenuator according to the present invention is supported on a stand 11 by means of posts 12 and 13 in which are clamped wave guides 14 and 16, either of which may be the input terminal to or the output terminal from the attenuator of Fig. 1. Although wave guides 14 and 16 are indicated as rectangular in form, it is to be understood that this showing is purely illustrative and that other shapes and forms of wave guides, such as, circular, elliptical, and otherwise, may be utilized. Preferably the main body of the attenuator of the invention is formed of a cylindrical casing 17 whose diameter is so chosen that, at the operating frequency of the device, cylinder 17, when acting as a wave guide, would have dimensions below cut-off when filled solely with air.

If we consider for the moment that wave guide 14 represents the energy input to the attenuator, it will be seen that this energy is then led to cylinder 17 through the T-connection of wave guide 14 and cylinder 17. At the junction of wave guide 14 and cylinder 17 is placed a block or plug 18 of dielectric material. This plug is made axially adjustable with respect to cylinder 17, by means of a slot 19 formed in cylinder 17 which cooperates with a set screw 21 passing through a ring 20 slidable on the outside of cylinder 17. By loosening screw 21, plug 18 may be slid axially of cylinder 17 and may be fixed in any desired position within the limits of slot 19 by tightening screw 21. Plug 18 is chosen of a dielectric material such that cylinder 17, when acting as a wave guide filled with this dielectric material will no longer be below cut-off but will freely transmit ultra high frequency of the operating frequency. Such a material may be "Polystyrene," glass, etc.

Plug 18 carries at each end a resistor 22 and 23. These resistors may be formed in any suitable manner, such as by painting a coating of graphite on the outer surface or plug 18 or by placing a suitable disc or slab of resistive material such as carbon, in or on the ends of plug 18. The purpose of resistors 22 and 23 is to serve as terminating impedances for the energy fed into or taken from the attenuator by way of wave guide 14, so that no impedance mismatch will occur to create harmful standing waves in this side of the system. The combination of the resistance of terminating resistor 22 and its position along cylinder 17 is selected to eliminate substantially any standing waves in wave guide 14.

Preferably, the left end of cylinder 17 is closed, as by a cap 24, although this is not necessary for the useful functioning of the device. Since the section of cylinder 17, containing dielectric plug 18, effectively forms a wave guide which is not dimensioned below cut-off, the energy supplied to the attenuator through wave guide 14 will tend to propagate along cylinder 17. However, the section of cylinder 17, not containing dielectric plug 18, serves as a wave guide dimensioned below cut-off and energy can no longer flow freely through this latter section. In accordance with the well-known theory, discussed in the prior copending application, such a section of wave guide serves as an attenuator, the amount of attenuation depending upon the length of the restricted portion of wave guide.

In the present device, a second plug 26 of similar dielectric material is also inserted in cylinder 17 and its position is preferably made adjustable with respect to that of plug 18. Thus, plug 26 is fixed to a sleeve 27 sliding on the outside of cylinder 17, as by means of a pin 28 which freely passes through a slot 29 in cylinder 17. In Fig. 1, sleeve 27 is shown as being rectangular in form and supplied with a rack 31 fixed to the underside thereof. Rack 31 cooperates with a pinion 32 connected to an adjusting knob 33 journaled in a suitable bearing post 34. In this manner, rotation of knob 33 serves to displace dielectric plug 26 along cylinder 17 and vary its separation from fixed plug 18.

As already discussed, cylinder 17 acts as a normal wave guide when filled with dielectric material, but as a wave guide below cut-off when such dielectric material is absent. Therefore, the adjutment of plug 26 serves to effectively adjust the length of the section of cylinder 17 which is acting as a wave guide below cut-off. Accordingly, the amount of high frequency energy fed through wave guide 14, which reaches plug 26, may be varied by means of knob 33. The remaining energy is dissipated mainly in the walls of cylinder 17, and to a slight extent in the terminating resistors 22 and 23.

Coupled to cylinder 17 is a transition section 36 composed of a cylindrical portion 37 having a diameter suitable for the free propagation of ultra high frequency energy therealong with air dielectric, and a section 38 which serves as a smooth transition between the rectangular wave guide 16 and cylindrical section 37. For purposes of convenience, the diameter of section 37 may be chosen to be the same as the maximum cross-sectional dimension of wave guide 16. Dielectric plug 26 is provided with a smoothly tapering section 39 which is preferably chosen of a length equivalent to several wavelengths of the operating frequency of the dielectric section 39. This portion of the device then acts to smoothly transfer the energy flowing within the portion of dielectric plug 26 within cylinder 17 to the wave guide 16 through the transition section 36. Preferably, a terminating resistor 41, similar to resistors 22 and 23, is placed on the left end of plug 26 so that the impedance of the attenuator, when viewed from wave guide 16, will remain substantially constant and properly terminated, independent of the setting of plug 26.

If desired, a diaphragm, such as 42, may be inserted in wave guide 14 and wave guide 16 to assist in matching the impedances of the source or load to that of the attenuator. Diaphragm 42 may be made adjustable in any well-known manner to provide an impedance matching adjustment.

A scale 43 may be mounted on the base 11 to cooperate with a pointer 44 fixed to the adjustable sleeve 27, whereby the desired attenuation may be suitably selected.

It will thus be seen that I have provided a relatively simply constructable attenuator whose only movable part in the electrical portion of the system is a dielectric plug. Thus, the accurate machining and complicated construction of the types of attenuator of the prior application are completely eliminated and replaced by a relatively simply constructed and easily adjusted device.

Although, cylinder 17 has been described as having a circular cross-section, it is to be understood that this is so chosen for purposes of convenience only, and that any suitable cross-section may be utilized, such as rectangular, elliptical, etc. This may be done in the present instance merely by correspondingly changing the cross-sections of plugs 18 and 26 and of sliding member 27. By making cylinder 17 a rectangular cross-section, the necessity for a transition piece such as 36 may be obviated.

Fig. 3 shows another form of attenuator according to the present invention. This modification is adapted to couple a concentric transmission line to a wave guide, either of which may act as the input or output terminal of the device. The concentric transmission line may be connected to a concentric transmission line terminal post 45 in any suitable manner. The inner conductor 46 of this terminal post extends through an opening in the cylindrical casing 47 of the attenuator in the form of an antenna or probe 48. Also located within cylinder 47 is a thick cylindrical plug 51, which is adapted to slide axially of cylinder 47. Plug 51 is preferably made of conducting material and is confined, solely, to axial translational movement along cylinder 47 by means of a slot 52 formed in cylinder 47 and a screw 53 passing freely through slot 52 and securing plug 51 to a sleeve 54 sliding on the outside of cylinder 47. Plug 51 is also provided with a slot 56 to avoid contact with antenna 48 of terminal post 45.

Sleeve 54 is fixed to a rack 57 cooperating with a pinion 58 which may be actuated by a knob, not shown, fastened to the shaft 59 or pinion 58, to provide an adjustment of the attenuation offered by the device. Cylinder 47 is connected to a wave guide 61 by a smooth transition section 62.

Plug 51 is provided with an axial bore whose diameter is so chosen that the interior of plug 51 may be considered to be a circular cross-section wave guide dimensioned below cut-off. Cylinder 47, on the other hand, is dimensioned to operate as a normal wave guide. It will be seen that by adjustment of shaft 59, the position of plug 51 relative to antenna probe 48 may be changed, so that the effective length of the below cut-off wave guide 51 to the right of antenna 48, may be suitably adjusted. If energy is considered to be fed to the attenuator through terminal post 45 and to be taken from the device through wave guide 61, it will be seen that adjustment of plug 51 interposes an adjustable length of cut-off wave guide in the path of energy flow, and thereby provides adjustable attenuation for this energy. The left end of cylinder 47 may be closed by a suitable cap 63 or may be left open, as desired, since the attenuation of plug 51 to the left of antenna 48 may be made to provide enough attenuation to prevent substantial leakage or radiation of energy from cylinder 47 even if the left end were to be left open.

It is to be understood here, also, that the wave guides formed by cylinder 47 and plug 51 may be any desired cross-section and that other forms of energy input and output terminals may be utilized. For example, terminal post 45 may be replaced by a suitable wave guide supplying energy within plug 51 in any suitable manner, or wave guide 61 may be replaced by a concentric line terminal.

Fig. 5 shows another modification of the attenuator of the invention, and may be considered to represent a form of inversion of the device shown in Fig. 3. In this instance, the cylinder 47 is replaced by a rectangular wave guide 47' and plug 51 is replaced by a pair of conducting metallic members 51' and 51'', which act to restrict the effective cross-section of this portion of the device with respect to the flow of high frequency energy.

In the present instance, instead of adjusting plug 51 with respect to the attenuator, the antenna probe 48 is made adjustable, in a manner similar to that shown in the preceding figures by means of a knob 64, pinion 65 and rack 66. Here, a self-contained source of high frequency energy, such as a suitable oscillator 67 or a suitable load may be located directly upon movable sleeve 54' so that the coupling between source or load 67 and antenna 48 may be made short, as is desirable.

The theory of operation of the device of Fig. 5 will be seen to be substantially identical with that of Fig. 3, since the length of the cut-off wave guide between the source and the load is made adjustable by this apparatus. In order to present a substantially constant load to the oscillator or load 67 despite the variation of attenuation offered by the device of the invention, it is desirable to insert a terminating impedance, such as is generally indicated at 68, in the wave guide 61'.

As shown more clearly in Fig. 7, terminating impedance 68 may comprise a carbon rod 71, preferably having metallic end caps 72, formed by pressing or plating on carbon rod 71, which are clamped by means of set screws 73 in a holder having two sections 74 and 75 suitably held together as by screws 76. The resistor 71 is so selected as to properly terminate the wave guide 61', so that its impedance when viewed from the left will remain substantially constant and terminated, and so that the impedance seen by the oscillator or load 67 will also remain substantially constant and properly terminated, despite the variable attenuation introduced by the device of the invention.

It will be noted that, in the device of Fig. 5, the right end of wave guide 47' is left open. As stated above with respect to Fig. 3, this has substantially no effect on the operation of the system since the attenuation offered prevents appreciable energy radiation.

If desired, the device of Fig. 5 could be made similar to that of Fig. 3 by providing a cylindrical casing 47 with fixed plug 51 and a movable antenna 48 as in Fig. 5. The plugs 51' and 51'' of Figs. 5 and 6 may be made as solid plugs of metal or may more simply be made of sheet material having a thickness at least as great as the skin depth of the high frequency currents at the operating frequency. Also, in the device of Fig. 3, the plug 51 could be made fixed and the antenna 48 movable, as desired.

Figs. 8 and 9 show another form of attenuator according to the present invention. This modification is generally similar to that of Fig. 2, but discloses an inverted relationship of fixed plug 18 and movable plug 27 of Fig. 2. Thus, in Fig. 8, plug 26' is maintained fixed and is provided with tapered portion 39' for coupling the wave guide formed by cylindrical casing 17 and plug 26' with output wave guide 16. A terminating resistor 68, which may be of the same form as that shown in Fig. 7, is utilized here also, to terminate the portion of the system to the left of the apparatus so that the impedance offered by the attenuator will remain unchanged and properly matched when viewed from the left, despite any variation in the attenuation offered. Plug 18', corresponding to plug 18 of Fig. 2, is now made movable by an arrangement similar to that shown in any of the preceding figures, under the control of knob 33. By adjustment of movable plug 18', the separation between dielectric plugs 26' and 18' may be varied. Since the portion of cylindrical casing 17, between these two dielectric plugs, forms a wave guide dimensioned below cut-off, and since the portions of cylindrical casing 17 containing the dielectric plugs 26' or 18' represent normal wave guide sections adapted to freely transmit high frequency energy of the operating frequency, it will be seen that the present invention interposes an adjustable length of cut-off wave guide to the flow of high frequency energy as in the preceding figures. Energy may be supplied to the attenuator or taken therefrom by means of a concentric line coupling 81 terminating in a probe 82 within a wave guide section 14 connected in T to the casing 17. A matching diaphragm 42 similar to that of Fig. 2, may be used.

It is to be understood that energy may be supplied to wave guide 14 by connecting other wave guides thereto in the manner shown in Fig. 2, if desired. Also, the energy coupling shown in Figs. 8 and 9 may be utilized in the apparatus of any of the preceding figures, if desired.

Movable dielectric plug 18' carries suitable terminating resistors 22', 23' at its ends, and plug 26' carries a terminating resistor 41' at its end. Resistors 22' and 23' are chosen to have such resistance value that the wave guide 14 and the circuit coupled to it by coupling 81 will be properly terminated for substantially all positions of dielectric plug 18', so that the impedance offered by the attenuator of the invention when viewed through coupling 81 will not vary appreciably with change in the attenuation value and will remain matched. Terminating resistor 41' assists in the loose coupling of the wave guide section formed by casing 17 and dielectric 26' with the cut-off wave guide formed by casing 17 with air dielectric. The operation of the device of Figs. 8 and 9 is substantially identical with that of the preceding figures.

It is to be noted that each of the attenuators of the present invention is completely bilateral in character, that is, an energy source may be connected to either end and an energy load or utilization device to the other end. Furthermore, in none of these modifications is the particular shape of wave guide critical so long as the functioning of the wave guide sections remains as described. The round or rectangular shapes illustrated have been utilized mainly for convenience of construction and assembly, but may be replaced by any other types desired.

Although in Figs. 3 and 5 the plugs 51, 51' and 51", restricting the cross-section of the wave guide, are preferably made of conducting material, it is to be noted that they may also be made of dielectric material, in which case the restricted wave guide section could be more properly termed a "dielectric guide," since it would be formed by a dielectric bounding medium for the space through which energy is conducted, rather than a metallic bounding medium as is the case with the more usual wave guide.

It is to be noted that in each of the modifications of the present invention, the terminal wave guide sections may be replaced by suitable concentric transmission line sections, either in the manner shown in Figs. 3 or 8, or in the manner shown in the preceding application Serial No. 452,319. Furthermore, any of the concentric transmission line terminals such as those shown in Figs. 3 or 8, may be replaced by suitable wave guide terminals, where desired.

Accordingly, I have shown several forms of wave guide attenuator device which are adapted to provide easily adjustable and attainable values of attenuation for the flow of high frequency energy in wave guide or concentric line systems.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An ultra high frequency attenuator, comprising a uniform wave guide adapted to freely transmit ultra high frequency energy of the operating frequency, means interposed in said wave guide to reduce the effective cross-section thereof below the cut-off value corresponding to said operating frequency, ultra high frequency energy coupling means connected to said wave guide at one end thereof, further ultra high frequency energy coupling means connected to said reduced cross-section portion of said wave guide, and means for adjusting the position of said further coupling means with respect to said reduced section wave guide portion to vary the amount of attenuation introduced between said pair of coupling means.

2. An ultra high frequency attenuator as in claim 1, wherein said last-named means comprises means for adjusting said further coupling means along said wave guide.

3. An ultra high frequency attenuator as in claim 1, wherein said last-named means comprises means for adjusting said reduced section wave guide portion along said wave guide.

4. An ultra high frequency attenuator comprising a uniform wave guide adapted to freely transmit ultra high frequency energy of the operating frequency, means for modifying a portion of said wave guide to form a wave guide section dimensioned below cut-off, whereby attenuation is interposed to the flow of said energy through said wave guide, and means coupled to the electromagnetic field within said below-cutoff section, said modifying means comprising means within said wave guide for decreasing the effective cross-section thereof to form said below-cutoff section and also including means for varying the position of said cross-section-decreasing means along said guide relative to said coupling means to change the effective length of said below-cutoff section to vary said attenuation.

5. An ultra high frequency attenuator comprising a uniform wave guide adapted to freely transmit ultra high frequency energy of the operating frequency, conductive means extending along and within said wave guide for reducing the cross-section thereof through which said energy passes to a value below cut-off for said operating frequency, high frequency coupling means connected at one end of said wave guide, high frequency terminating means connected at the other end of said wave guide, further coupling means coupled to said wave guide within said conductive means, and means for varying the relative positions of said further coupling means and said conductive means, whereby an adjustable length of below-cut-off wave guide is interposed between said two coupling means.

6. An ultra high frequency attenuator comprising a uniform wave guide adapted to freely transmit ultra high frequency energy of the operating frequency, conductive means within said wave guide and extending therealong for reducing the cross-section of a section of said wave guide to a value below cut-off, ultra high frequency energy coupling means at one end of said wave guide, further ultra high frequency energy coupling means within said reduced cross-section, and means for longitudinally varying the relative positions of said reduced cross-section section and said two coupling means for varying the attenuation between said two coupling means.

7. Variable-amplitude ultra high frequency signal generator apparatus, comprising a source of ultra high frequency energy having an output probe, a uniform wave guide having a slot in one face thereof for receiving said probe, said wave guide having a cross-sectional area adapted to freely transmit ultra high frequency energy of the frequency of said source, conductive means within said wave guide at the location of said probe and extending along said wave guide for a predetermined distance, whereby said wave guide cross-sectional area is reduced to a value below cut-off, an output coupling connected to said wave guide at one end thereof, and means for varying the location of said source along said slotted wall, whereby variable lengths of said below-cut-off section are interposed between said source and said output coupling.

8. An ultra high frequency attenuator comprising a uniform wave guide adapted to freely transmit ultra high frequency energy of the operating frequency, conductive means within said wave guide and extending therealong for reducing the cross-section of a section of said wave guide to a value below cut-off, ultra high frequency energy coupling means at one end of said wave guide, further ultra high frequency energy coupling means at said reduced cross-section, and means for varying the length of said reduced cross-section section between said two coupling means for varying the attenuation between said two coupling means, said last-named means comprising means for moving said conductive means relative to said wave guide.

9. An ultra high frequency attenuator comprising a uniform wave guide adapted to freely transmit ultra high frequency energy of the operating frequency, means movable within said wave guide for modifying a portion of said guide to form a wave guide section dimensioned below cut-off, whereby attenuation is interposed to the flow of said energy through said wave guide, and coupling means extending within said movable modifying means and longitudinally movable relatively thereto.

10. Variable-amplitude ultra high frequency signal generator apparatus, comprising a source of ultra high frequency energy having an output probe, a uniform wave guide having a slot in one face thereof for receiving said probe, said wave guide having a cross-sectional area adapted to freely transmit ultra high frequency energy of the frequency of said source, conductive means within said wave guide at the location of said probe and extending along said wave guide for a predetermined distance, whereby said wave guide cross-sectional area is reduced to a value below cut-off, an output coupling connected to said wave guide at one end thereof, and means for varying the relative location of said source along said slotted wall with respect to said conductive means, whereby variable lengths of said below-cut-off section are interposed between said source and said output coupling.

11. An ultra high frequency attenuator comprising a uniform wave guide adapted to freely transmit ultra high frequency energy of the operating frequency, conductive means within said wave guide and extending therealong for reducing the cross-section of a section of said wave guide to a value below cut-off, ultra high frequency energy coupling means at one end of said wave guide, further ultra high frequency energy coupling means within said reduced cross-section, and means for varying the length of said reduced cross-section section between said two coupling means for varying the attenuation between said two coupling means and wherein said last-named means comprises means for moving said conductive means relative to said wave guide.

12. An ultra high frequency device comprising an elongated hollow conductive member, conductive means extending along said member for reducing the cross-section thereof, high frequency energy coupling means at a predetermined point of said member, further high frequency coupling means coupled to said conductive means, and means for longitudinally adjusting said further coupling means and said conductive means relative to one another.

13. An ultra high frequency attenuator comprising a uniform wave guide adapted to freely transmit ultra high frequency energy of the operating frequency, conductive means within said wave guide and extending therealong for reducing the cross-section of a section of said wave guide to a value below cut-off, ultra high frequency energy coupling means at one end of said wave guide, further ultra high frequency energy coupling means within said reduced cross-section, and means for varying the length of said reduced cross-section section between said two coupling means, said last-named means comprising means for moving said further coupling means relative to said wave guide and conductive means.

EDWARD L. GINZTON.